United States Patent [19]
Hernandez et al.

[11] Patent Number: 5,785,387
[45] Date of Patent: Jul. 28, 1998

[54] VEHICLE SEAT ASSEMBLY WITH POSITION-FIXING MEANS

[75] Inventors: Ruben Hernandez, Belvedere; John D. Lindman, Rockford; Roger L. Brock, Roscoe, all of Ill.

[73] Assignee: Excel Industries, Inc., Elkhart, Ind.

[21] Appl. No.: 718,649

[22] Filed: Sep. 23, 1996

[51] Int. Cl.$^6$ .................................................. B60N 2/42
[52] U.S. Cl. ........................... 297/473; 297/479; 297/340; 248/429
[58] Field of Search ........................... 297/340–341, 297/373, 473, 476, 479; 248/429, 430

[56] References Cited

U.S. PATENT DOCUMENTS

| | | |
|---|---|---|
| 3,940,182 | 2/1976 | Tamura . |
| 4,101,169 | 7/1978 | Muraishi et al. . |
| 4,190,226 | 2/1980 | Letournoux et al. . |
| 4,204,658 | 5/1980 | Courtols .................. 248/430 |
| 4,209,159 | 6/1980 | Becker et al. ............ 248/430 |
| 4,238,099 | 12/1980 | Hunwicks ................ 248/430 |
| 4,262,963 | 4/1981 | Bauer et al. ............. 267/473 |
| 4,378,101 | 3/1983 | Kazaoka et al. . |
| 4,423,904 | 1/1984 | Crawford . |
| 4,440,442 | 4/1984 | Drouillard et al. . |
| 4,449,752 | 5/1984 | Yasumatsu et al. . |
| 4,526,424 | 7/1985 | Korth ...................... 297/473 |
| 4,569,557 | 2/1986 | Goforth . |
| 4,601,455 | 7/1986 | Lowe et al. . |
| 4,621,867 | 11/1986 | Perring et al. . |
| 4,639,038 | 1/1987 | Heling . |
| 4,652,052 | 3/1987 | Hessler et al. . |
| 4,671,571 | 6/1987 | Gionet . |
| 4,707,030 | 11/1987 | Harding . |
| 4,726,617 | 2/1988 | Nishimura ............... 297/473 |
| 4,730,804 | 3/1988 | Higuchi et al. .......... 297/429 |
| 4,742,983 | 5/1988 | Nihei . |
| 4,756,503 | 7/1988 | Fujita ...................... 297/473 |
| 4,781,354 | 11/1988 | Nihei et al. . |
| 4,804,229 | 2/1989 | Nishino ................... 297/473 |
| 4,818,022 | 4/1989 | Nishimura ............... 297/473 |
| 4,844,542 | 7/1989 | Humer . |
| 4,852,846 | 8/1989 | Weier . |
| 4,881,774 | 11/1989 | Bradley et al. . |
| 4,909,570 | 3/1990 | Matsuhashi . |
| 4,940,285 | 7/1990 | Suzuki et al. ........... 297/473 |
| 4,951,966 | 8/1990 | Nihei . |

(List continued on next page.)

*Primary Examiner*—Peter M. Cuomo
*Assistant Examiner*—Anthony D. Barfield
*Attorney, Agent, or Firm*—Banner & Witcoff Ltd.

[57] ABSTRACT

A vehicle seat assembly has first and second fore-and-aft extending lower track sub-assemblies for mounting to a vehicle, typically to the floor pan of the passenger compartment of the vehicle. First and second upper track sub-assemblies are carried by the lower track sub-assemblies. More specifically, the upper track sub-assemblies each include a track slidingly coupled with a corresponding lower track. One or both of the upper track sub-assemblies further includes a structurally robust J-hook which receives a downward flange of the corresponding lower track sub-assembly. The overlapping flange and J-hook arrangement limits vertical dislocation of the upper track sub-assembly, and, therefore, also limits vertical dislocation of the vehicle seat, relative the lower track sub-assembly. In the normal condition, the flange and J-hook arrangement permits free fore-and-aft travel. That is, the sliding tracks can be moved relative each other for adjustment of the fore-and-aft position of the vehicle seat. The J-hook and flange further cooperatively provide position-fixing means for resisting fore-and-aft movement. Specifically, during such time as the flange and J-hook engage each other in a dislocation condition, to limit further upward dislocation of the seat, the position-fixing means is operative to also resist fore-and-aft movement of the seat. The position-fixing means in preferred embodiments is substantially structurally more robust than a typical seat adjuster, such as a latching mechanism used to set the fore-and-aft position of a vehicle seat. Thus, both vertical and fore-and-aft position of the seat is controlled against dislocation forces which might otherwise damage the seat assembly.

21 Claims, 5 Drawing Sheets

U.S. PATENT DOCUMENTS

| | | |
|---|---|---|
| 4,969,621 | 11/1990 | Münchow et al. . |
| 4,979,716 | 12/1990 | Holdampf . |
| 5,020,853 | 6/1991 | Babbs . |
| 5,052,751 | 10/1991 | Hayakawa et al. . |
| 5,100,092 | 3/1992 | Sovis . |
| 5,104,084 | 4/1992 | Kumagai et al. . |
| 5,125,611 | 6/1992 | Cox ............................................ 248/429 |
| 5,273,241 | 12/1993 | Droulon . |
| 5,286,076 | 2/1994 | DeVoss et al. . |
| 5,318,341 | 6/1994 | Griswold et al. . |
| 5,322,348 | 6/1994 | Johnson et al. . |
| 5,352,019 | 10/1994 | Bauer et al. . |
| 5,358,207 | 10/1994 | West . |
| 5,362,132 | 11/1994 | Griswold et al. . |
| 5,383,640 | 1/1995 | Johnson et al. . |
| 5,407,165 | 4/1995 | Balocke . |
| 5,529,397 | 6/1996 | Yoshida .................................. 248/430 |
| 5,531,503 | 7/1996 | Hughes .................................. 297/341 |

VEHICLE SEAT ASSEMBLY WITH POSITION-FIXING MEANS

INTRODUCTION

The present invention relates to a vehicle seat assembly and, in particular, to a seat assembly optionally carrying a seat belt system, that is structurally configured to resist vertical dislocation and, in particular, while withstanding vertical dislocation, to also resist fore-and-aft dislocation forces.

BACKGROUND

Vehicle seat assemblies with seat position adjusters of various types are well known, including seat assemblies wherein the seat cushion is carried on tracks, so as to be adjustable in the fore-and-aft direction. Typically, the seat back portion is mounted to the seat cushion portion, such that it travels fore-and-aft along with the seat cushion portion during position adjustment. The seat back may, of course, be mounted via a recliner, such that it is also pivotally adjustable to a more reclined or less reclined position.

The sliding track arrangement may include laterally spaced lower tracks extending fore-and-aft in general alignment with the sides of the seat cushion. The lower tracks may be mounted in fixed position on the vehicle floor pan, optionally with a riser or the like to establish its correct height and orientation. The seat cushion frame typically includes a pair of upper tracks slidingly mounted, one each, on the corresponding fixed lower tracks. Various hand-operated latch assemblies are well known for releasably fixing the seat at any of a series of fore-and-aft positions. Typically, a latch is releasably spring biased into engagement with one or more apertures in a so-called window plate or the like, mounted in fixed position along one or both lower tracks. A hand operable release mechanism for overcoming the latch spring, such as a well known "towel bar" mechanism, may be provided for operating the latch assembly.

The upper and lower tracks typically are vertically interlocked, often with a ball bearing or other reduced friction interface between them, such that the seat cannot be easily vertically dislocated from the lower tracks. Greater vertical dislocation forces may be experienced, however, than the interlocking tracks can withstand without unacceptable levels of permanent deformation or other damage. Especially for vehicle seat assemblies in which a seat belt system is mounted directed to the seat assembly, rather than to the vehicle structure (e.g., the B-pillar and/or the vehicle floor pan), vertical dislocation forces may be experienced beyond the design strength of the interlocking tracks. Vehicle seats wherein a seat belt system is mounted directly to the seat frame are illustrated, for example, in U.S. Pat. No. 5,362,132 issued to Griswold et al, and in U.S. Pat. No. 5,318,341, also issued to Griswold et al. Such patents illustrate the known approach of employing J-hooks to anchor a seat cushion frame to the lower track sub-assembly against upward dislocation forces. Specifically, in the particular designs shown there, an upper J-hook (that is, a J-hook which is upwardly open) extends into the interior of a lower J-hook (that is, a J-hook which is downwardly open) or U-shaped latch bracket mounted to the vehicle floor pan directly or to componentry associated with the lower track. In normal operation this fore-and-aft extending overlap does not involve actual contact. In the event of high vertical dislocation forces, however, the seat cushion would lift only until the upper J-hook contacted its fixed counterpart. Thus, the J-hook arrangement enables the vehicle seat to withstand vertical dislocation forces beyond the level which can be withstood by the more lightly designed interlocking slide tracks and seat adjusters.

While such known J-hook arrangements are useful in withstanding excessive vertical dislocation forces, they fail to provide adequate resistance to dislocation forces in the fore-and-aft direction. Since such fore-and-aft dislocation forces may well accompany vertical dislocation forces, there is a need to provide means for withstanding both of these forces. In that regard, a latch mechanism or similar seat adjuster would provide some limited resistance to undesirable fore-and-aft dislocation. As mentioned above, however, such latch mechanisms typically are more lightly designed for ease of operation and other design considerations. The ability to withstand greater fore-and-aft dislocation forces is needed especially, for example, for vehicle seats wherein the seat belt assembly is attached directly to the seat frame, rather than to the surrounding vehicle structure.

Accordingly, it is an object of the present invention to provide vehicle seat assemblies having good ability to withstand both vertical dislocation forces and fore-and-aft dislocation forces. Additional objects and features of the invention will become apparent from the following disclosure and detailed description of various preferred embodiments.

SUMMARY

In accordance with a first aspect, a vehicle seat assembly comprises lower track sub-assemblies adapted for mounting to a vehicle, typically to the floor pan of a vehicle. The lower track sub-assemblies each include a generally fore-and-aft extending lower track and, in addition, a generally fore-and-aft extending downward flange, e.g., a lower J-hook. As will be understood further below, such downward flange is structurally robust. Upper track sub-assemblies provide an upper track slidingly carried on the corresponding lower tracks. At least one of the upper track sub-assemblies further provides an upper or upwardly open J-hook, which receives the aforementioned downward flange of the lower track sub-assembly. The upper J-hook receives the downward flange in the sense that the free edge of the J-hook overlaps the downward flange. Typically, the free edge of the downward flange, or more precisely a fore-and-aft extending edge of the downward flange, is received into a fore-and-aft extending trough of the upper J-hook. Correspondingly, the free edge of the upper J-hook is received into a generally U-shaped or otherwise overhanging zone defined by the downward flange. Preferably, the J-hook and the downward flange are not in contact during normal operation of the vehicle seat. The overlapping configuration of the J-hook and downward flange will limit or resist excessive vertical dislocation of the upper track sub-assembly relative the lower track sub-assembly, while in the normal condition permitting fore-and-aft travel for seat position adjustment. Fore-and-aft travel in normal operation would typically be governed by a latch mechanism, electrically powered drive mechanism, or the like. The J-hook and downward flange further cooperatively provide dislocation position-fixing means for resisting fore-and-aft movement of the seat, that is, of the upper track sub-assemblies relative the lower track sub-assemblies. Such dislocation position-fixing means for resisting fore-and-aft movement would be operative when the upper track sub-assembly had vertically dislocated relative the lower tracks. Preferably, the interaction of the J-hook with the downward flange becomes operative to resist further dislocation before there has been enough vertical dislocation to damage the interlocking slide tracks. Similarly, such interaction resists fore-and-aft dislocation preferably before the latch mechanism or other fore-and-aft seat position adjuster sustains any significant permanent damage. In any event, when there is sufficient vertical dislocation to bring the J-hook into contact with the downward flange, the just mentioned dislocation position-fixing means also becomes operative to resist fore-and-aft dislocation; specifically, it becomes operative to resist fore-and-aft dislocation forces greater than would be withstood by the seat's adjuster.

In accordance with various preferred embodiments further discussed below, the fore-and-aft dislocation position-fixing means may comprise downwardly extending teeth spaced longitudinally (i.e., in a fore-and-aft direction) along the free edge of the flange. Correspondingly sized and spaced apertures, such as through-holes, indentations, notches or the like, are provided in the J-hook. Thus, upon engagement of the flange by the J-hook in the event of vertical dislocation, the simultaneous engagement of one or more flange teeth by (or into) the J-hook apertures resists fore-and-aft dislocation. As noted above, the flange and J-hook, in accordance with known designs, preferably are structurally robust, such as to resist dislocation forces beyond the design limits of the slide tracks, latch mechanisms, etc. Again, preferably, the fore-and-aft position-fixing means becomes operative prior to substantial permanent damage to any such latch mechanism by fore-and-aft dislocation forces acting on the vehicle seat.

It will be realized by those skilled in the art, that is, by those who are experienced in this area of technology, that the vehicle seat assemblies disclosed here represent a significant and important advance. Good management of dislocation forces in a vehicle can serve to improve the vehicle's reliability and durability. Especially, for example, in vehicle seat designs wherein a seat belt assembly is mounted directly to the seat frame, good management of both vertical dislocation forces and now also fore-and-aft dislocation forces, can be provided. Moreover, this enhanced functionality can be achieved in accordance with preferred embodiments, in designs which are elegant and readily suitable for manufacture and assembly using current motor vehicle assembly techniques. These and additional features and advantages will be more readily apparent from the following detailed description of certain preferred embodiments.

BRIEF DESCRIPTION OF THE DRAWINGS

The accompanying drawings form a part of this specification, and illustrate several aspects of the disclosed vehicle seat assemblies, together serving to explain also the principles of operation. Thus, preferred embodiments are discussed below with reference to the appended drawings wherein.

It should be understood that the appended drawings are not necessarily to scale, presenting a somewhat simplified representation of various preferred features illustrative of the basic principles of the invention. It will be well within the ability of those skilled in the art, given the benefit of this disclosure and description of the invention, to design vehicle seat assemblies in accordance with this invention suitable for specific intended applications (taking into account, for example, the size of a particular motor vehicle in which the vehicle seat assembly will be used, the topography of the floor pan in its passenger compartment, etc.). Certain features of the illustrated embodiments may have been enlarged or distorted relative to others to facilitate visualization and clear understanding. In particular, thin features may be thickened, for example, for clarity of illustration. All references to direction and position, unless otherwise indicated, refer to the orientation of the vehicle seat assembly illustrated in the particular drawing. In general, reference to a lateral direction means the direction from the driver's side to the passenger's side of the vehicle (and/or the opposite direction). The fore-and-aft direction, of course, refers to the direction from the front of the vehicle to the back (and/or the opposite direction).

DETAILED DESCRIPTION OF CERTAIN PREFERRED EMBODIMENTS

Figure 1:
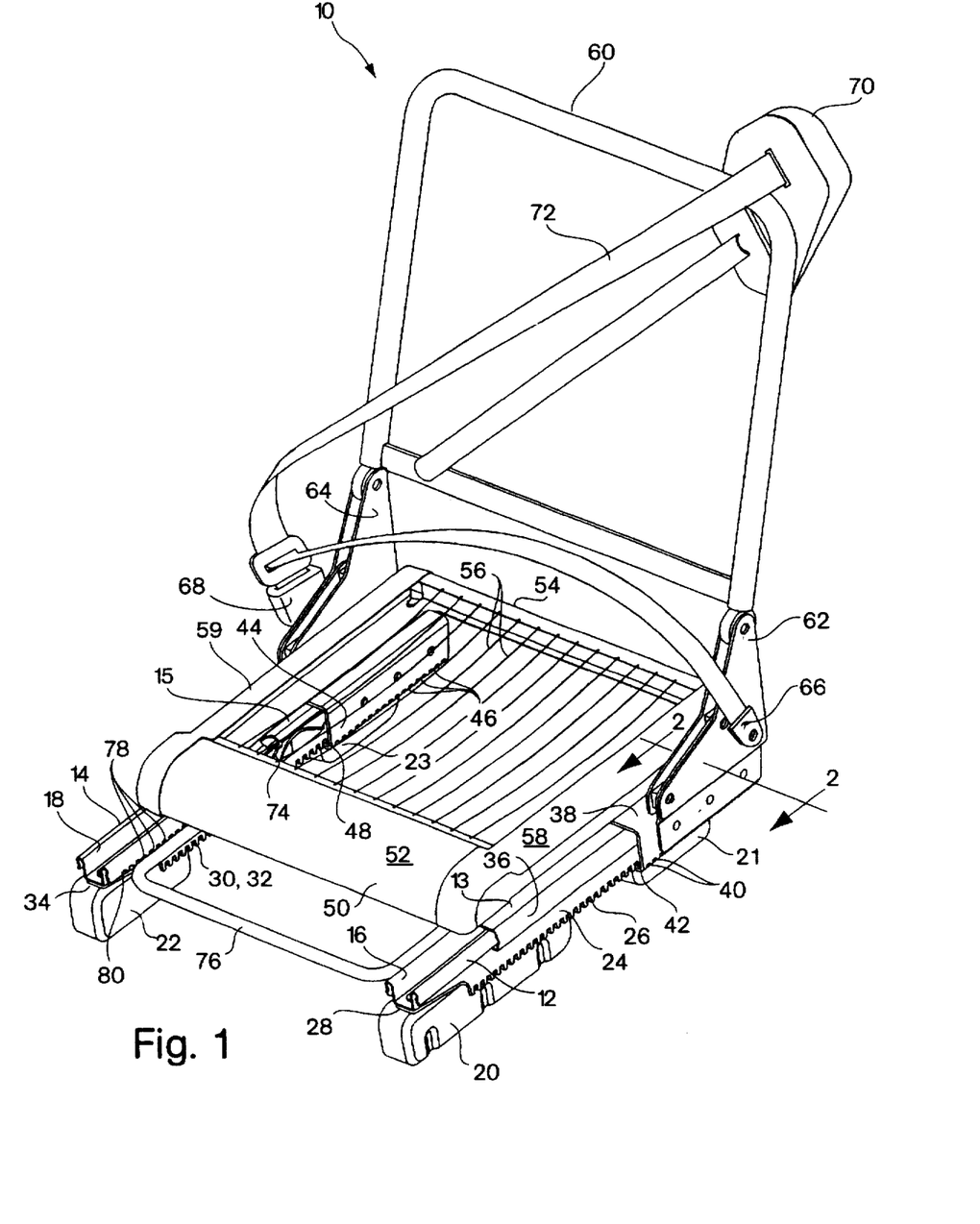
FIG. 1 is a perspective view of a vehicle seat assembly in accordance with a first preferred embodiment, including a seat cushion frame, a seat back frame, and an integrated 3-point seat belt assembly.
Figure 2:
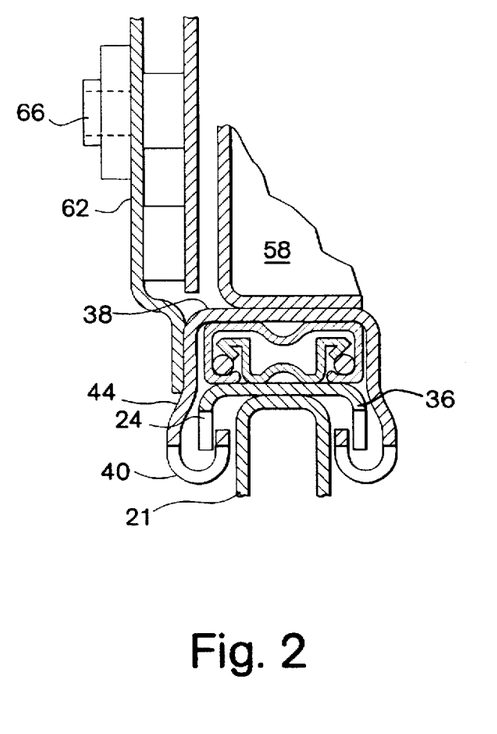
FIG. 2 is a cross-sectional view of a portion of the vehicle seat assembly of FIG. 1, taken through line 2—2 of FIG. 1.

It will be readily apparent to those skilled in the art that the vehicle seat assemblies disclosed here will be useful in many different applications. For purposes of the present description of certain preferred embodiments, vehicle seat assemblies will be described with particular focus on the driver and front passenger seats for an automobile. Referring now to FIGS. 1 and 2, a vehicle seat assembly 10 is seen to comprise a first fore-and-aft extending lower track sub-assembly 12 and a second fore-and-aft extending lower track sub-assembly 14. Lower track sub-assembly 12 is on the left-hand side (based on the orientation of a seat occupant), and is laterally spaced from right-hand side lower track sub-assembly 14. The first or left-hand side lower track sub-assembly is seen to include a generally fore-and-aft extending first lower track 16. Correspondingly, the right-hand side lower track sub-assembly 14 includes lower track 18. Front and rear left-side risers 20, 21 are adapted for mounting onto the floor pan within the passenger compartment of a motor vehicle to provide correct positioning and orientation of the lower track sub-assembly 12. Similarly, the opposite side lower track sub-assembly 14 is mounted onto forward and rear risers 22, 23. The left-hand side lower track sub-assembly 12 further comprises a generally fore-and-aft extending downward flange 24 formed generally in the nature of a lower J-hook. It can be seen that free edge 26 of downward flange 24 is formed as a series of longitudinally spaced, downwardly projecting teeth. Downward flange 24 is provided as an integral component of the lower track sub-assembly 12 in the preferred embodiment of FIGS. 1 and 2. Specifically, it is seen to have a flange portion 28 sandwiched between the lower track 16 above it, and the forward and rear risers 20, 21 below it. Similarly, the lower track sub-assembly on the right-hand side includes a generally fore-and-aft extending downward flange 30 having a free edge 32 formed as longitudinally spaced, downwardly projecting teeth, and a flange portion 34 sandwiched between the right-hand side lower track and the right-hand side forward and rear risers.

Left side and right side upper track sub-assemblies are carried by the corresponding lower track sub-assemblies. The left-hand side upper track sub-assembly is seen to comprise an upper track 36 slidingly coupled with the lower track 16. It further comprises an upper J-hook 38 integrated with the upper track 36, as by welding, bolting, or other suitable attachment means. It can be seen that the free edge 26 is received by upper J-hook 38. More specifically, in the normal operating mode wherein the upper track sub-assembly 13 is not vertically dislocated from the lower track sub-assembly 12, the free edge 26 of downward flange 24 does not contact upper J-hook 38. It can be seen, however, that upon upward dislocation of upper track sub-assembly 13, the longitudinally spaced teeth of free edge 26 would be received into through-hole apertures 40 at the base of the upwardly trough portion 42 of upper J-hook 38. Correspondingly, the right-hand side upper track sub-assembly 15 includes upper J-hook 44, with apertures 46 sized and spaced correspondingly to downwardly projecting teeth 32 of downward flange 36. As in the case of the J-hook on the left-hand side, the trough portion 48 of J-hook 44 receives the free edge of the downward flange 30 with preferably no contact when the seat assembly is in its normal operating condition. Here again, however, upward dislocation of the upper track sub-assembly relative to the lower track sub-assembly will be vertically resisted by engagement of the J-hook 44 with downward flange 30, and fore-and-aft dislocation will be resisted by engagement of apertures 46 by downwardly projecting teeth 32 when such vertical dislocation occurs.

Although the apertures of the upper J-hooks 38 and 44 are shown in the preferred embodiments of FIGS. 1 and 2 as through-holes, it will be readily understood that alternatively the apertures may be provided in the form of detents or like configuration suitable to provide good fore-and-aft dislocation resistance upon engagement with the corresponding configuration of the downward flange. In that regard, the downward flange and J-hooks permit free fore-and-aft travel in the normal operating mode, in the sense that they are not engaged or locked together by vertical dislocation of the upper track sub-assembly relative the lower track sub-assembly. Optionally, they may be touching, but should permit in the normal operating mode relatively unimpeded fore-and-aft adjustment of the seat assembly.

Thus, in the preferred embodiments of FIGS. 1 and 2, the J-hooks in normal operation are substantially passive. If the upper seat track starts to vertically dislocate, heading toward separation from the lower track, the upper J-hook engages the free edge of the downward flange to resist further dislocation. As noted above, such engagement occurs preferably at a point sufficiently early to prevent any substantial permanent damage to the seat tracks, latch mechanism and other componentry of the seat assembly. At the time of such engagement, the interlocking configuration of the J-hook and downward flange will also resist fore-and-aft dislocation, again preferably before fore-and-aft dislocation has occurred to an extent which would cause substantial permanent damage to componentry of the vehicle seat assembly. In view of the preferably robust nature of the J-hook and downward flange, preferred embodiments of the seat assembly disclosed here are well suited to the load carrying requirements associated with seat belt attachment directly to the seat assembly.

The left side and right side upper track sub-assemblies are integrated by means of seat cushion frame 50 comprising forward lateral beam 52 and rearward lateral beam 54. A number of fore-and-aft extending wires 56 are provided for supporting a seat cushion (not shown). In addition, left side and right side rails 58, 59 extend in a fore-and-aft direction generally positioned over the corresponding upper tracks. The vehicle seat assembly is seen to further include a frame 60 for a seat back, which is pivotally attached to the seat cushion frame 50 by means of left and right-hand side recliners 62, 64. In the preferred embodiment illustrated, the recliners are integrated with the upper track sub-assemblies, being attached by welding or other suitably robust means to the corresponding upper J-hooks 38, 44. An integrated, J-point seat belt assembly is provided, with left and right-hand side lower attachments 66, 68 secured to the left and right-hand side recliners 62, 64 respectively. The seat belt sub-assembly further includes a retractor 70 mounted at the upper left side corner of the seat back frame 60, and a seat belt 72.

The fore-and-aft position of the vehicle seat assembly illustrated in FIGS. 1 and 2 can be adjusted. That is, in its normal operating mode a latch assembly 74 is hand-operable by lever 76, a so-called towel bar type lever. The latch mechanism 74 includes a latch which is substantially less robust than the J-hook and downward flange components described above. In the embodiment of FIGS. 1 and 2, the latch in normal operation engages a selected one or more windows or apertures 78 formed along the free edge 80 of lower track 18. Thus, the window plate of the latch assembly 74 is formed unitarily with lower track 18. A corresponding latch and window plate arrangement optionally is provided in the left-hand side of the seat assembly, also being operable by towel bar 76. It will be understood from this disclosure that a latch of a seat adjuster in a vehicle seat assembly as disclosed here could engage the downwardly extending teeth or like configuration of the downward flange and/or the apertures of the upper J-hook. Thus, the fore-and-aft dislocation-resisting means of the vehicle seat assemblies disclosed here could serve also as a component of the adjuster. Otherwise, the J-hook typically is mounted parallel to the window plate of the seat adjuster.

Figure 3:
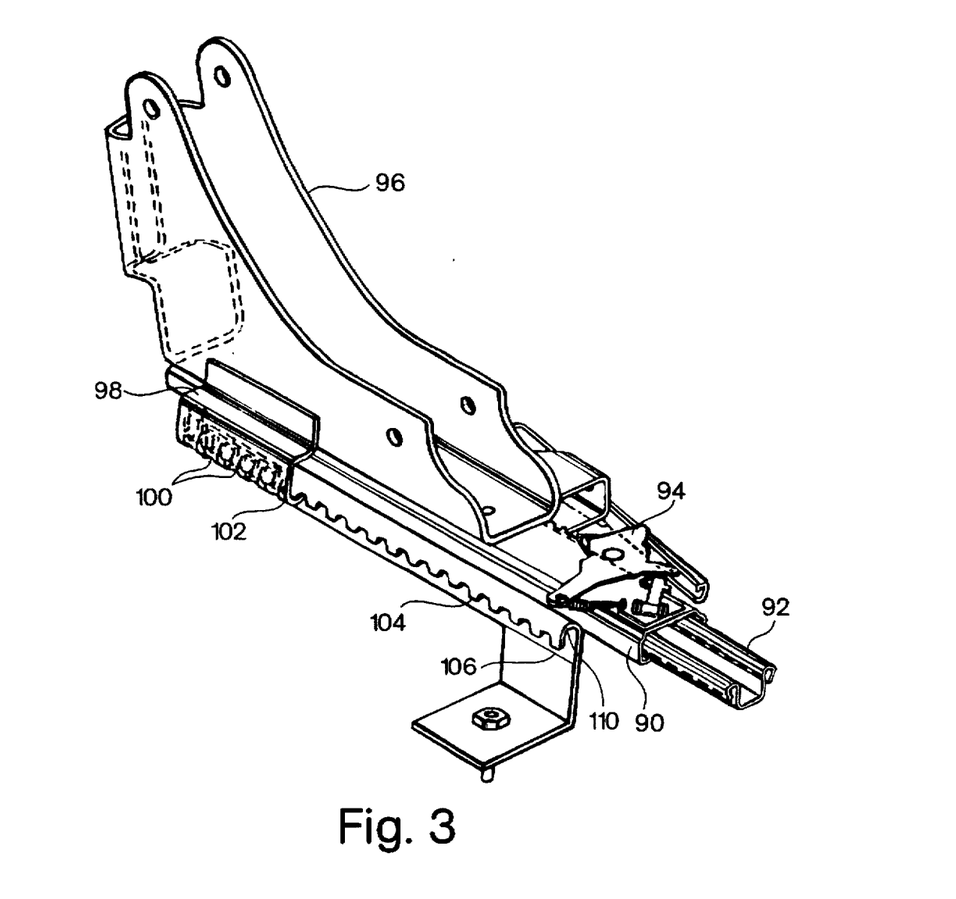
FIG. 3 is a perspective view, partially cut away, of a vehicle seat assembly in accordance with a second preferred embodiment, showing an upper track sub-assembly slidingly mounted on a lower track sub-assembly.

An alternative embodiment is illustrated in FIG. 3. An upper track 90 is slidingly coupled to lower track 92. A latch assembly 94 is mounted to the upper track 90, as is recliner bracket 96. An upper J-hook 98 is bolted, welded, or otherwise suitably attached to recliner bracket 96. Upper J-hook 98 forms a series of apertures 100 spaced longitudinally (that is, in the fore-and-aft direction) in its trough 102. Trough 102 receives the free edge 104 of downward flange 106, which is seen to be mounted directly to the floor pan of a motor vehicle. Downward flange 106 has the configuration of a lower (that is, a downwardly open) J-hook. It may be referred to as part of the lower track sub-assembly in that it is mounted parallel to lower track 92, and sufficiently near to be in overlapping relationship with the upper J-hook 98. The term "overlapping relationship" with reference to the embodiment of FIG. 3 means that the free edge 104 of downward flange 106 is received into trough 102 of upper J-hook 98, while free edge 108 of upper J-hook 98 is received into trough 110 of downward flange 106. It will be appreciated by those skilled in the art, given the benefit of the present disclosure, that the upper and lower tracks may slidingly couple to each other in any suitable configuration. Conventional sliding tracks typically employ rollers or other friction reducing bearing means. Interlocking configurations are known, as well as roller-less configurations.

Figure 4:
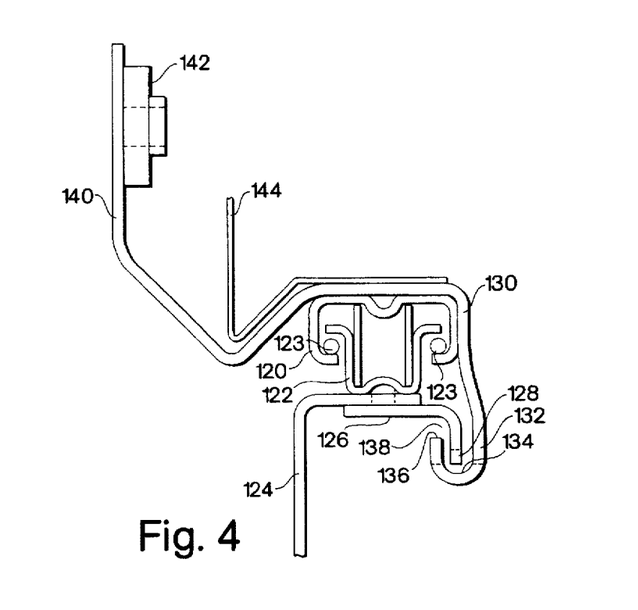
FIG. 4 is schematic cross-sectional view, partially cut away, of another preferred embodiment of a vehicle seat assembly, showing a J-hook of an upper track sub-assembly receiving a downward flange of a lower track sub-assembly in their normal condition for free fore-and-aft travel.
Figure 5:
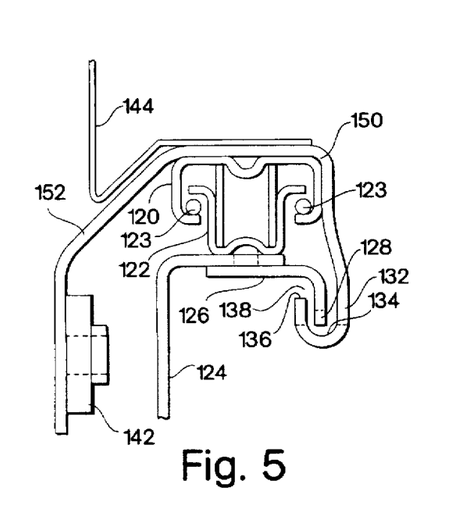
FIG. 5 is a schematic cross-sectional view, partially cut away, corresponding to the view of FIG. 4, of yet another preferred embodiment.
Figure 6:
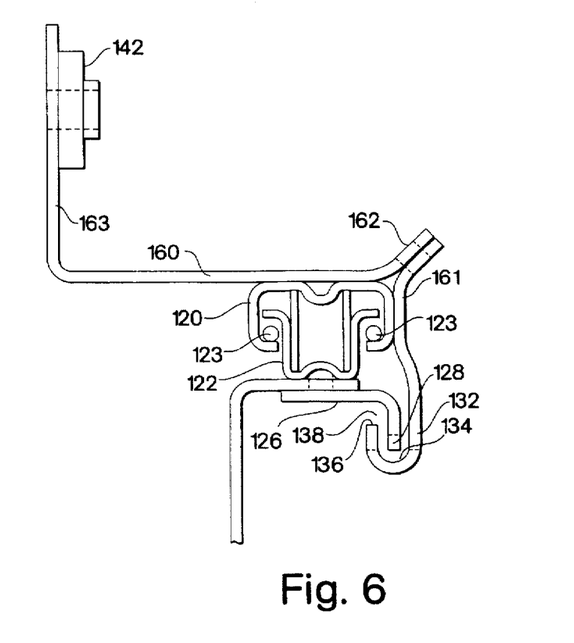
FIG. 6 is a schematic cross-sectional view, partially cut away, corresponding to the views of FIG. 4 and FIG. 5, illustrating yet another preferred embodiment.

FIGS. 4 through 6 present cross-sectional views illustrating alternative embodiments for seat belt brackets integrated into vehicle seat assemblies in accordance with the present disclosure. In FIG. 4, an upper track 120 is slidingly coupled to a lower track 122 mounted on a riser 124. A downward flange 126, integral with the lower track and riser, has a free edge 128 forming downwardly extending teeth substantially in the manner described above. Plate 130 is configured to form an upper J-hook 132 having a trough 134 which receives free edge 128 of downward flange 126. J-hook 132 and downward flange 126 are seen to be mutually overlapping in the sense that free edge 136 of J-hook 132 is received into the generally downwardly open zone 138 defined by downward flange 126. Plate 136 extends upwardly to form seat belt bracket 140, carrying seat belt attachment means 142. Seat pan side rail 144 of a seat cushion frame is carried by the upper track sub-assembly comprising upper track 120 and plate 130. Bearings 123 are provided between the upper and lower tracks. In FIGS. 5 and 6, elements which are common with the embodiment of FIG. 4 are given the same reference number. Thus, upper track 120 is slidingly coupled to lower track 122 mounted on riser 124. A structurally robust plate 150 is seen to form the J-hook 132 which is mutually overlapping with downward flange 128. Plate 150 further forms a "tucked" seat belt bracket 152, carrying seat belt attachment mechanism 142. It can be seen that seat belt bracket 152 extends downwardly below the slidingly coupled seat tracks. In the embodiment of FIG. 6 the seat belt bracket 163 is formed by plate 160, which is welded or otherwise attached to upper track 120. The J-hook 132 is formed by plate 161, attached by rivet 162 to the aforesaid plate 160. Alternative suitable configurations will be readily apparent to those skilled in the art in view of the present disclosure.

Figure 7:
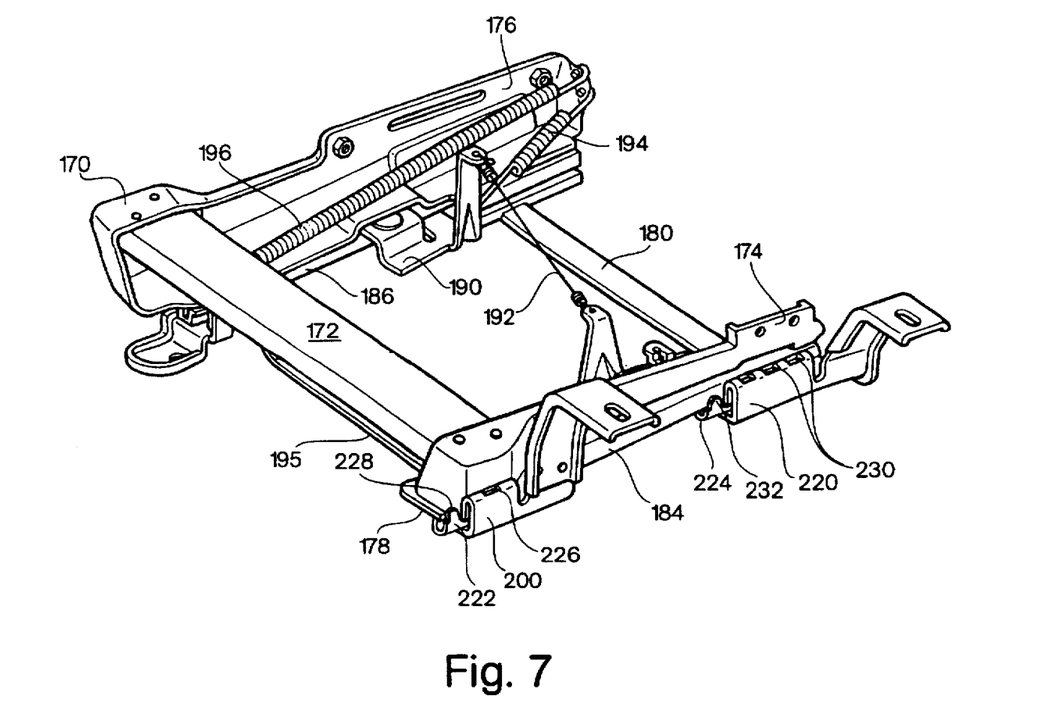
FIG. 7 is a perspective view of selected components of a vehicle seat assembly in accordance with another preferred embodiment.

The vehicle seat assembly in accordance with the alternative embodiment illustrated in FIG. 7 is movable from a single normal fore-and-aft position to a full-forward or "dumped" position. The full-forward position normally is for permitting access to a rear seat of the vehicle. In the embodiment of FIG. 7, upper seat frame 170 includes front cross brace 172 and side rails 174, 176. Lower frame 178 includes rear cross brace 180, along with left side rail 184 and right side rail 186. A latching mechanism is provided to affix the seat in its normal operating position. The latching mechanism includes right side latch member 188 and left side latch member 190, which are interconnected by slave wire 192. Thus, latch operating lever 195 operates on one of the two latch members which in turn, by means of the slave wire 192, operates on the opposite latch member. Assist spring 196 assists in moving the seat to its "dumped" position when the latching members are released from their latching position. It can be seen that the lower seat frame includes a lower J-hook 200 at the forward end of left side rail 184, and lower J-hook 220 at the rear end of rail 184. Corresponding right and left lower J-hooks preferably are provided at the right side rail of the lower frame. Forward upper J-hook 222 is carried by rail 174, and is seen to be in mutually overlapping engagement with lower J-hook 200. Similarly, upper J-hood 224 is carried at the rear end of rail 174, and is in overlapping engagement with lower J-hook 220. Again, corresponding upper J-hooks preferably are provided at right side rail 176 to engage the lower J-hooks mentioned above. Lower J-hook 220 provides aperture 226 to receive an upwardly extending tooth or projection from the free edge 228 of upper J-hook 222. Similarly, a plurality of apertures 230 are provided in lower J-hook 220 to receive correspondingly spaced and sized projections extending upwardly from free edge 232 of upper J-hook 224. Accordingly, the overlapping or mutually received J-hooks will be passive in the normal operating position of the seat assembly of FIG. 7, they will operate, however, to resist both vertical dislocation of upper frame 170 and in the event of upward dislocation sufficient to engage the J-hooks, will also operate to resist fore-and-aft dislocation. Such resistance to fore-and-aft dislocation will substantially exceed the resistance which would be provided by the latching mechanism.

In view of the foregoing disclosure, various modifications, additions and other alternative embodiments within the true scope and spirit of the present invention will be apparent to those skilled in the art. The appended claims define the invention in accordance with such true scope and spirit.

We claim:

1. A vehicle seat assembly comprising, in combination:

first and second fore-and-aft extending lower track sub-assemblies for mounting to a vehicle generally horizontally and laterally spaced from each other, the first lower track sub-assembly comprising a generally fore-and-aft extending first lower track, and the second lower track assembly comprising a generally fore-and-aft extending second lower track;

a generally fore-and-aft extending first downward flange external of the first and second lower track, having a toothed free edge; and first and second upper track sub-assemblies carried by the first and second lower track sub-assemblies respectively, the first upper track sub-assembly comprising a first upper track slidingly coupled with the first lower track and an upwardly open, first upper J-hook external of the first upper track and first lower track, and terminating below a bottom-most surface of the first lower track and the second upper track sub-assembly comprising a second upper track slidingly coupled with the second lower track;

wherein the first downward flange is received by the first upper J-hook below the bottom-most surface of the first lower track permitting fore-and-aft travel in a normal operating condition, and limiting vertical dislocation of the first upper track sub-assembly relative the first lower track sub-assembly, the first downward flange and first upper J-hook cooperatively providing dislocation position-fixing means for resisting fore-and-aft movement of the first upper J-hook relative the first downward flange upon upward dislocation of the first upper track sub-assembly relative the first lower track sub-assembly.

2. The vehicle seat assembly according to claim 1 further comprising a seat belt attachment bracket mounted to the first upper track sub-assembly.

3. The vehicle seat assembly according to claim 1 wherein the toothed free edge of the first downward flange comprises longitudinally spaced teeth downwardly projecting from the first downward flange, and the first upper J-hook has correspondingly sized and spaced apertures, a plurality of the teeth being engageable with a plurality of the apertures upon upward dislocation of the first upper track seat assembly relative the first lower track seat assembly, engagement of the teeth with the apertures resisting fore-and-aft movement of the first upper track seat assembly relative the first lower track seat assembly.

4. The vehicle seat assembly according to claim 3 wherein the apertures of the first upper J-hook are through-holes.

5. The vehicle seat assembly according to claim 3 further comprising a position-fixing latch for releasably fixing the fore-and-aft position of the upper track sub-assembly relative the lower track sub-assembly.

6. The vehicle seat assembly according to claim 5 wherein the position-fixing latch is mounted to the first upper track sub-assembly and is releasably biased into engagement with teeth of the first downward flange.

7. The vehicle seat assembly according to claim 6 wherein the latch position fixing further comprises hand-operable release means for temporarily moving the latch out of engagement with the teeth of the first downward flange.

8. The vehicle seat assembly according to claim 5 wherein the position-fixing latch is mounted to the first upper track sub-assembly and is releasably biased into engagement with a window plate carried by the first lower track sub-assembly.

9. The vehicle seat assembly according to claim 1 wherein the first upper J-hook is mounted directly to the first upper track.

10. The vehicle seat assembly according to claim 1 further comprising first and second recliner brackets for holding a seat back frame in an adjustable, generally vertical position, the first recliner bracket being mounted aft on the first upper track, the second recliner bracket being mounted aft on the second upper track, and the first upper J-hook being mounted directly on the first recliner bracket.

11. The vehicle seat assembly according to claim 1 wherein the first downward flange is welded to the first lower track.

12. The vehicle seat assembly according to claim 1 wherein the first lower track sub-assembly further comprises a first lower riser supporting and extending downwardly from the first lower track, and the second lower track sub-assembly further comprises a second lower riser supporting and extending downwardly from the second lower track, the first downward flange being welded to the first lower riser.

13. The vehicle seat assembly according to claim 1 wherein a generally fore-and-aft extending second downward flange and the second upper track sub-assembly further comprises a second upper J-hook, the second downward flange being received by the second upper J-hook, permitting fore-and-aft travel in a normal operating mode, and limiting vertical displacement of the second upper track sub-assembly relative the second lower track sub-assembly, the second downward flange and second upper J-hook cooperatively providing second dislocation position-fixing means for resisting fore-and-aft movement of the second downward flange relative the second upper J-hook upon upward dislocation of the second upper track sub-assembly relative the second lower track sub-assembly.

14. The vehicle seat assembly of claim 1 wherein the first upper J-hook has apertures sized and spaced to receive the toothed free edge of the first downward flange.

15. The vehicle seat assembly of claim 1 further comprising a latch assembly for fixing the fore-and-aft position of at least one upper track sub-assembly relative to at least a corresponding lower track sub-assembly.

16. The vehicle seat assembly of claim 15 wherein the latch assembly comprises a window plate integral with a lower track sub-assembly, and a latch to releasably engage the window plate at any of multiple selectable locations.

17. The vehicle seat assembly of claim 16 wherein the window plate comprises a fore-and-aft extending series of apertures formed along a free edge of one of the lower tracks.

18. The vehicle seat assembly of claim 17 wherein the first upper J-hook has apertures sized and spaced to receive the toothed free edge of the first downward flange, separate from the series of apertures of the latch assembly.

19. A vehicle seat assembly comprising, in combination:
A) a seat track assembly comprising:
first and second fore-and-aft extending lower track sub-assemblies laterally spaced from each other, the first lower track sub-assembly comprising
a generally fore-and-aft extending first lower track and
a generally fore-and-aft extending first notched flange,
and the second lower track sub-assembly comprising
a generally fore-and-aft extending second lower track and
a generally fore-and-aft extending second notched flange,
the first and second lower track sub-assemblies being adapted to a floor pan of a passenger compartment of a vehicle;
first and second upper track sub-assemblies carried by the first and second lower track sub-assemblies respectively, the first upper track sub-assembly comprising
a first upper track slidingly coupled with the first lower track and
an upwardly open first upper J-hook terminating below a bottom-most surface of the front lower track,
and the second upper track sub-assembly comprising
a second upper track slidingly coupled with the second lower track and
an upwardly open second upper J-hook terminating below a bottom-most surface of the second lower track,
wherein the first notched flange is received by the first upper J-hook below the bottom-most surface of the first lower track, permitting fore-and-aft travel in a normal operating condition, and limiting vertical dislocation of the first upper first sub-assembly relative the first lower track sub-assembly, the first upper J-hook and first notched flange cooperatively providing dislocation position-fixing means for resisting fore-and-aft travel of the first upper track sub-assembly relative the first lower track sub-assembly upon upward dislocation of the first upper track sub-assembly into a dislocation condition, the dislocation position-fixing means comprising downwardly extending teeth longitudinally spaced along a free edge of the first notched flange below the bottom-most surface of the first lower track, and correspondingly sized and spaced apertures in the first upper J-hook for receiving a plurality of the downwardly extending teeth upon upward dislocation of the first upper track sub-assembly into the dislocation condition, and wherein the second notched flange is received by the second upper J-hook below the bottom-most surface of the second lower track, permitting fore-and-aft travel in a normal operating condition, and limiting vertical dislocation of the second upper track sub-assembly relative the first lower track sub-assembly, the second upper J-hook and second notched flange cooperatively providing second dislocation position-fixing means for resisting fore-and-aft travel of the second upper track sub-assembly relative the second lower track sub-assembly upon upward dislocation of the second upper track sub-assembly into a dislocation condition, the second dislocation position-fixing means comprising downwardly extending teeth longitudinally spaced along a free edge of the second notched flange below the bottom-most surface of the second lower track, and correspondingly sized and spaced apertures in the second upper J-hook for receiving a plurality of the downwardly extending teeth upon upward dislocation of the second upper track sub-assembly into the dislocation condition;

B) a seat frame assembly carried by the seat track assembly, comprising a seat cushion frame and a seat back frame interconnected by first and second recliner brackets; and C) a seat belt assembly comprising multiple seat belt attachment fixtures, each of the seat belt attachment fixtures being integrated with the seat frame assembly.

20. A vehicle seat assembly comprising, in combination:

first and second fore-and-aft extending lower track sub-assemblies for mounting to a vehicle generally horizontally and laterally spaced from each other, the first lower track sub-assembly comprising a generally fore-and-aft extending first lower track, and the second lower track assembly comprising a generally fore-and-aft extending second lower track;

a generally fore-and-aft extending first downward flange external of the first and second lower track; and first and second upper track sub-assemblies carried by the first and second lower track sub-assemblies respectively, the first upper track sub-assembly comprising a first upper track slidingly coupled with the first lower track and an upwardly open, first upper J-hook terminating below a bottom-most surface of the first lower track, and the second upper track sub-assembly comprising a second upper track slidingly coupled with the second lower track, the first upper J-hook being external of the upper tracks and lower tracks and having a fore-and-aft extending series of aperture therein;

wherein the first downward flange is received by the first upper J-hook below the bottom-most surface of the first lower track, permitting fore-and-aft travel in a normal operating condition, and limiting vertical dislocation of the first upper track sub-assembly relative the first lower track sub-assembly, the first downward flange and first upper J-hook cooperatively providing dislocation position-fixing means for resisting fore-and-aft movement of the first upper J-hook relative the first downward flange upon upward dislocation of the first upper track sub-assembly relative the first lower track sub-assembly.

21. The vehicle seat assembly of claim 20 further comprising a latch assembly for fixing the fore-and-aft position of at least one upper track sub-assembly relative to at least a corresponding lower track sub-assembly.

* * * * *